March 5, 1968 — D. M. WEITZNER — 3,371,933
SOUND PRODUCING DEVICE
Filed Oct. 19, 1965 — 3 Sheets-Sheet 1

INVENTOR
Dorothea M. Weitzner
BY Polachek & Saulsbury
ATTORNEYS

March 5, 1968  D. M. WEITZNER  3,371,933
SOUND PRODUCING DEVICE
Filed Oct. 19, 1965  3 Sheets-Sheet 2
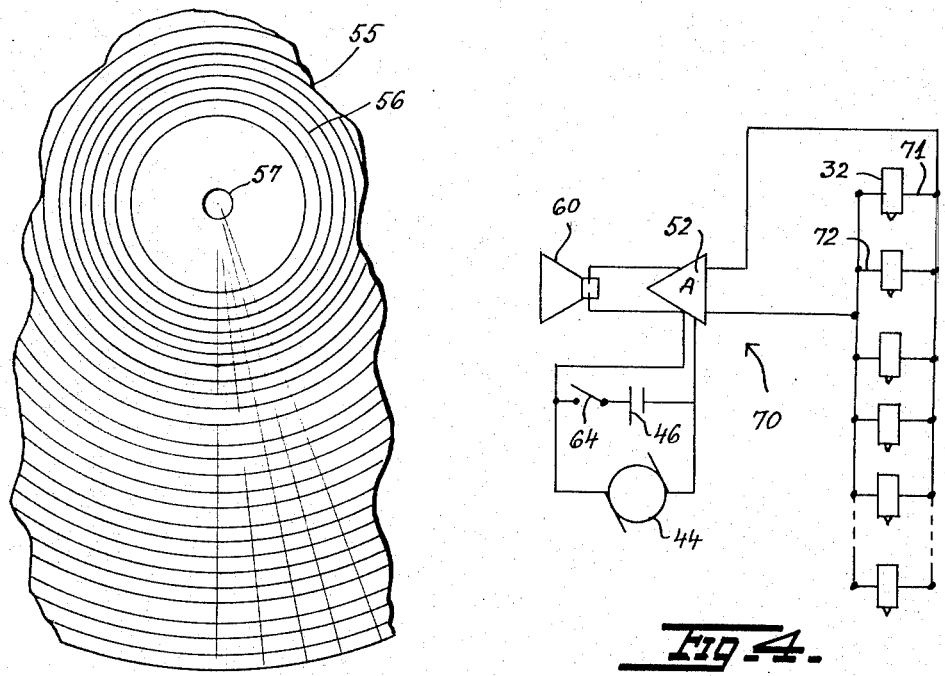
Fig. 3.
Fig. 4.
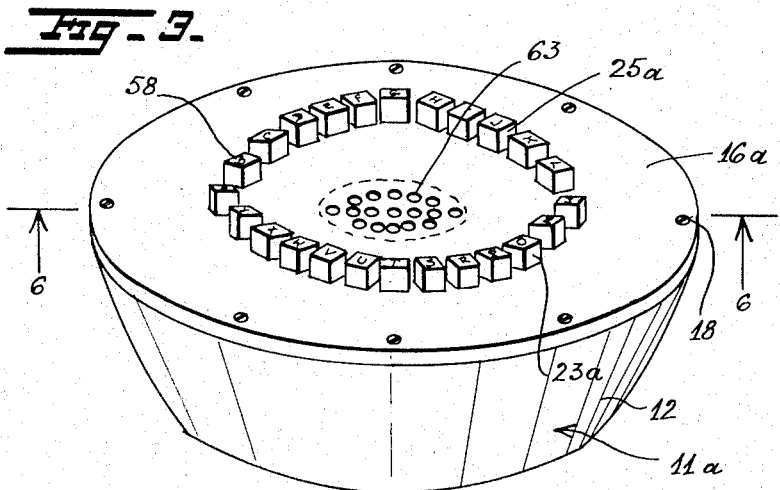
Fig. 5.
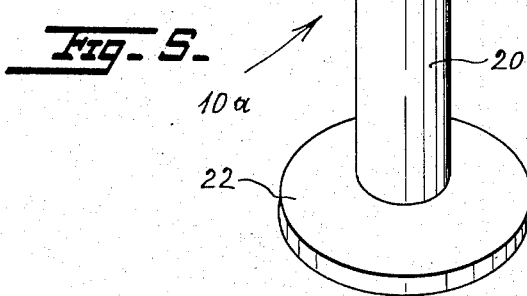
INVENTOR
Dorothea M. Weitzner
BY
Polachek & Saulsbury
ATTORNEYS

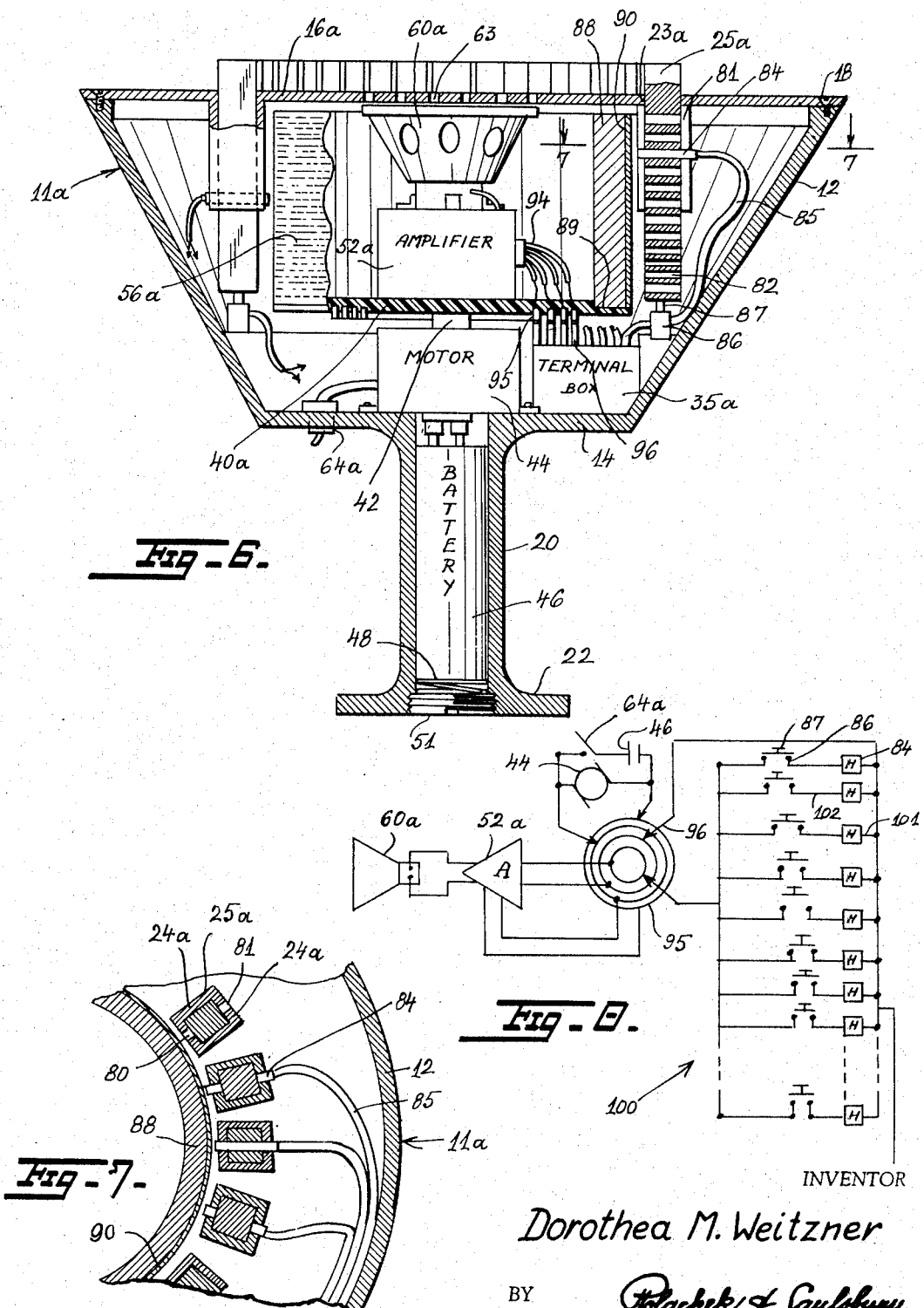

United States Patent Office 3,371,933
Patented Mar. 5, 1968

3,371,933
SOUND PRODUCING DEVICE
Dorothea M. Weitzner, 8 E. 62nd St.,
New York, N.Y. 10021
Filed Oct. 19, 1965, Ser. No. 497,776
3 Claims. (Cl. 274—1)

ABSTRACT OF THE DISCLOSURE

The disclosure describes a sound producing device in the form of a compact unit which can be stood on a table. Inside a casing is a rotatable drum carrying magnetic tracks around its periphery. Elongated push-buttons exposed at the top of the casing are movable inside the casing to close switches connected in circuit with magnetic pick-up heads carried by the push-buttons in selected bores spaced longitudinally of the push-buttons. A loudspeaker inside the drum projects sound upwardly through the apertured top of the casing.

---

This invention relates to the art of sound producing devices and more particularly concerns a device which has a multiplicity of prerecorded audio signals which can be selectively reproduced audibly in response to operation pushbuttons.

It is a principal object of the invention to provide a device which can be used for educational or entertainment purposes, including a casing in which is a sound record medium on which is recorded a multiplicity of audio signals, the signals constituting musical tones, speech sounds such as vowels, consonants, etc., or other kinds of sounds such as bird calls, and the like.

Another object is to provide a device of the character described, wherein any one or more of the recorded sounds is reproduced in response to operation of one or more pushbuttons arranged in an array on the face or dial of the casing.

Still another object is to provide a device as described, wherein the pushbutton carries a transducer for picking up the recorded audio signal and transmitting it electrically to a loudspeaker in the casing.

Another object is to provide a device as described wherein the casing has a stand by means of which the device can be held in the hand or placed on a stationary support in operative position.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 3 is a plan view of part of a record medium employed in the device.

FIG. 4 is a diagram of an electrical circuit employed in the device.

FIG. 5 is a front oblique view of another device embodying the invention.

FIG. 6 is an enlarged vertical sectional view taken on line 6—6 of FIG. 5.

FIG. 7 is a fragmentary horizontal view taken on line 7—7 of FIG. 6.

FIG. 8 is a diagram of an electrical circuit employed in the device of FIGS. 5–7.

Figure 1:
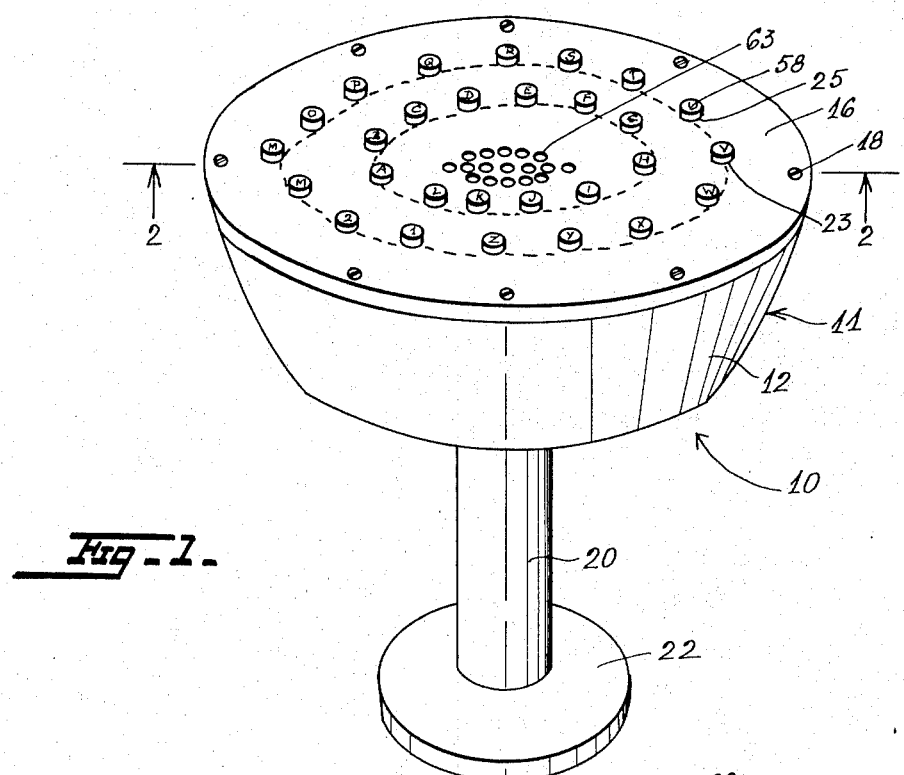
FIGURE 1 is a front oblique view of a device embodying the invention.
Figure 2:
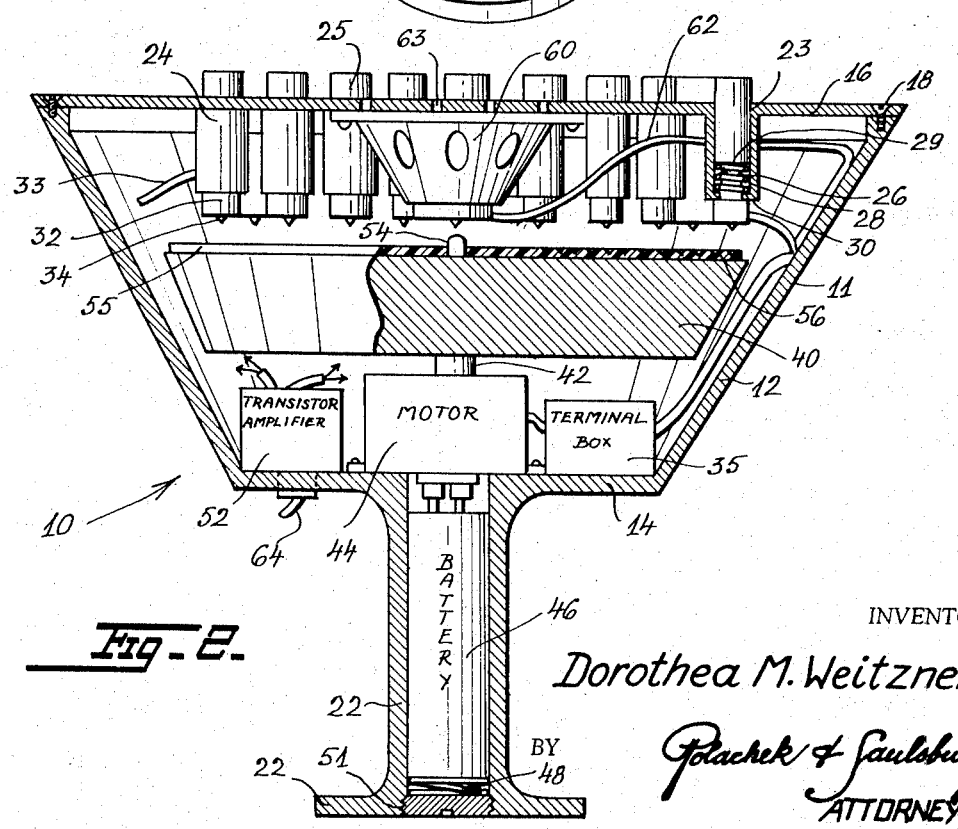
FIG. 2 is an enlarged longitudinal sectional view taken on line 2—2 of FIG. 1.

Referring first to FIGS. 1 and 2, there is shown sound reproducing device 10. The device has a dished casing 11 with frusto-conical side wall 12, circular bottom wall 14 and an open top. Mounted on the open top of the casing is a circular cover plate 16 removably secured by screws 18 engaged in the periphery of the side wall. Extending axially downwardly from the bottom wall 14 is a tubular post 20 formed with an annular flange 22 at its bottom end. The post and flange constitute a stand for the device. The post 20 can be held in the hand of a person using the device.

The top or cover plate 16 is formed with a multiplicity of radially and circumferentially spaced holes 23. Surrounding each hole and formed integrally with the plate 16 is a cylindrical sleeve 24. Each sleeve extends axially inwardly or downwardly of the casing from the underside of the plate 16. Slidably disposed in each sleeve is a cylindrical pushbutton 25. Each pushbutton has a section 26 of reduced diameter around which is a coil spring 28. Each spring bears on an annular shoulder 29 formed at the upper end of section 26 and at its lower end the spring bears on an annular flange 30 formed at the bottom of each sleeve 24. Each pushbutton carries a cylindrical transducer 32 at its lower end. Each transducer is a phonograph pickup cartridge with a needle 34 extending downwardly from the underside of the cartridge. Electric wires 33 extend from each cartridge and terminate at a circuit terminal box 35 mounted at the upper side of bottom wall 14 inside the casing.

The needle 34 of each cartridge is elevated above a horizontal light metal or plastic turntable 40. The turntable rotates axially on shaft 42 of a motor 44 secured to the bottom wall 14. The motor is connected to terminal box 35. Electrically connected to the motor is battery 46 which is disposed in the tubular post 20. The battery is urged upwardly by a coil spring 48 bearing on a screw closure 50 fitted in a threaded hole 51 in the bottom of the post. The screw closure 50 can be removed for replacing the battery. The battery is also connected via the motor and terminal box to a transistor amplifier 52 mounted on bottom wall 14.

The turntable has an axially extending spindle 54 on which may be removably placed a phonograph record disk 55. This record disk as best shown in FIG. 3 has a central hole 57 to engage the spindle, and a multiplicity of concentric, circular grooves 56 in each one of which is recorded a different sound whose character is indicated by symbols or indicia 58 marked on the upper flat exposed side of each pushbutton, 25.

Centrally located under the plate 16 and secured thereto is a loudspeaker 60 connected via cable 62 to the terminal box 35. Holes 63 in the plate 16 above the loudspeaker emit sound from the casing.

This pushbutton, phonograph cartridges and the needles are arranged so that each needle engages and tracks a different groove 56 of the record disk 55. A switch 64 is attached to the underside of the bottom wall 14 and extends into the casing. The switch is connected to terminal box 35 in an electric circuit 70 shown in FIG. 4 to which reference is now made.

Each cartridge 32 has one terminal 71 connected to one input terminal of the amplifier 52. The other terminal 72 is connected to the input terminal of the amplifier. The loudspeaker 60 is connected to the output of the amplifier. Battery 46 is connected via switch 64 to the power supply input terminals of the amplifier and to the motor 44.

In operation of device 10 and circuit 70, switch 64 will be closed to energize the amplifier and start the motor. Then any one or more pushbuttons 25 can be selectively pressed down until the spring 28 is fully compressed.

The phonograph transducer cartridge 32 will pick up the audio signal recorded in the grooves or tracks 56 followed by the needles of the depressed pushbuttons and a selected sound or sounds will be audibly reproduced via loudspeaker 63.

The device 10 can be used for language learning or other educational purposes, for amusement, and the like. The device can be held in the hand or mounted on a table or other support for convenient use. The record 56 can be replaced by removal of plate 16. If desired an external source of electric power can be connected in circuit 70 in place of the battery.

In FIGS. 5, 6 and 7 is shown another sound reproducing device 10a which is generally similar to device 10 and corresponding parts are identically numbered.

In the upper cover plate 16a of the casing 11a are formed circumferentially spaced rectangular holes 23a in which are rectangular or noncircular pushbuttons 25a. Each pushbutton moves axially vertically in a rectangular sleeve 24a having aligned slots 80, 81. Each pushbutton has a multiplicity of vertically spaced transverse bores or holes 82. Selectively seated in just one of the holes is a transducer in the form of a magnetic pickup head 84. Each head extends out of slots 80, 81 and is connected via wires 85 and a pushbutton microswitch 86 to terminal box 35 on the bottom wall 14 of the casing. The pushbutton 25 rests on the operating knob 87 of the microswitch 86.

Turntable 40a which is carried by shaft 42 of the motor 44 supports a removable cylindrical drum 88 seated in an annular recess 89 formed near the periphery of the drum. On the external side of the drum is a magnetic coating 90. The coating has a multiplicity of circumferential magnetic tracks 56a in which are recorded different sounds. The tracks are spaced apart axially of the drum and coating. The tracks are arranged so that when a pushbutton 25a is fully depressed to close the normally open switch 86 on which it rests, the transducer head 84 will be located adjacent a selected one of the tracks 56a. The holes 82 enable the transducers to be conveniently set at different elevations in the respective pushbuttons 25a so that each transducer head can pick up audio signals from a different track 56a.

Amplifier 52a is mounted on the turntable 40a and rotates with it. Loudspeaker 60a is mounted on the amplifier and rotates with the turntable. The amplifier has four terminal wires 94 each connected to a different one of four concentric slip rings 95 embedded in the underside of the turntable and projecting downwardly therefrom. Wiper contact springs 96 are supported by and extend upwardly from the terminal box 35a. These springs ride along the rings 95 respectively to complete an electric circuit 100 shown in FIG. 8.

Referring to FIG. 8, it will be noted that two of the slip rings 95 are connected to the signal input terminals of amplifier 52a. The other two rings are connected to the power supply terminals of the amplifier 52. One terminal 101 of each of the transducer heads 84 is connected to one of the wiper springs 96. The other terminal 102 of the transducer head is connected to one contact of the pushbutton microswitch 86. The other contact of each switch is connected to a second one of the wiper springs. Battery 46 has one terminal connected to a third slip ring and switch 64 which is connected in series with the battery and has one terminal connected to a fourth one of the slip rings. The loudspeaker is connected to the signal output terminals of the amplifier.

In operation of device 10a and circuit 100, switch 64a will be closed to start the motor 44 and to energize the amplifier via the slip rings and wiper contacts. Any one or more of the pushbuttons 25a can be depressed to select any one or more tracks respectively from which sounds will be reproduced via the loudspeaker. The button or knob 87 of the microswitch 86 associated with each selected pushbutton will be depressed to close the switch. This will apply an audio signal picked up from the selected track to the amplifier input for audible reproduction by the loudspeaker.

Device 10a, like device 10, can be energized by an external power supply if desired. The drum 88 with magnetic coating 90 can be removed from the casing if desired and replaced with another drum having other sounds recorded thereon. The indicia 58 on the pushbuttons 25a will indicate the character of the sound which will be reproduced by pressing the pushbutton.

In both forms of the invention the user is provided with a convenient, attractive sound reproducing appliance which is responsive to actuation of one or more pushbuttons to reproduce one or more prerecorded sounds in sequence or simultaneously.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A sound reproducing device, comprising a hollow generally cylindrical axially vertical casing, a flat cover plate horizontally disposed and removably mounted on said casing, said plate having a plurality of circumferentially spaced openings therein, arranged in a circle; elongated push-buttons axially movable and slidably mounted in said openings; sleeves depending from the plate and registering with said openings, said sleeves receiving and guiding said push-buttons in axial movement; a rotatable cylindrical turntable in said casing axially aligned with said plate; a cylindrical drum having its axis substantially parallel to the longitudinal axes of the pushbuttons and having a magnetic coating thereon, said drum surrounding and removably supported on said turntable, said magnetic coating constituting a record medium with circular signal tracks extending circumferentially around the drum and spaced apart axially of the drum, said push-buttons each having a plurality of transverse bores spaced longitudinally; magnetic pick-up heads removably mounted in selected ones of the bores in the several push-buttons for picking up signals from selected signal tracks; an axially vertical hollow post integral with the casing for supporting the same and for containing a battery power supply; a motor disposed in the casing under said turntable and operatively connected thereto to turn the turntable, so that the heads pickup signals from said selected signal tracks when any of the several push-buttons are fully depressed.

2. A sound reproducing device according to claim 1 further comprising a loudspeaker in the casing disposed under said plate, said plate having central apertures for projecting sound upwardly from the loudspeaker out of the casing, and an amplifier in the casing connected in circuit with said pick-up heads and said loudspeaker for audibly reproducing signals picked up by the transducers.

3. A sound reproducing device according to claim 1, further comprising a loudspeaker in the casing disposed under said plate, said plate having central apertures for projecting sound upwardly from the loudspeaker out of the casing, an amplifier in the casing connected in circuit with said loudspeaker, and, said loudspeaker and amplifier being disposed inside the drum and supported by said turntable to rotate therewith, slip rings carried by the turntable, stationary wiper contacts contacting the slip rings and electrically connecting said amplifier with said power supply, and normally open switches located below each of the pushbuttons, said switches being closed respectively when the pushbuttons are depressed, said switches being connected in circuit with said transducers and said amplifier for passing signals picked up by the pick-up heads to the amplifier when the switches are closed for reproduction by the loudspeaker.

References Cited

UNITED STATES PATENTS

| | | | |
|---|---|---|---|
| 802,135 | 10/1905 | Bryant | 274—42 |
| 1,218,324 | 3/1917 | Severy | 274—1.8 |
| 1,326,955 | 1/1920 | Mueller | 274—1.8 |
| 1,710,692 | 4/1929 | Cregier | 274—18 |
| 1,746,959 | 2/1930 | Neely | 274—18 |
| 1,747,733 | 2/1930 | Patterson | 274—1.8 |
| 2,224,358 | 12/1940 | Quisling | 274—1.8 |
| 2,579,872 | 12/1951 | Segal et al. | 274—1.1 |
| 2,930,624 | 3/1960 | Banholzer | 274—1 X |
| 3,112,569 | 12/1963 | Moore et al. | 35—5 |
| 3,136,072 | 6/1964 | Ross | 35—5 |
| 3,289,325 | 12/1966 | Schreck | 35—35.3 |

LEONARD FORMAN, *Primary Examiner.*

LLOYD V. ANDERSON, *Assistant Examiner.*